United States Patent [19]

Koike

[11] Patent Number: 4,468,052
[45] Date of Patent: Aug. 28, 1984

[54] AUTOMOTIVE VEHICLE BODY STRUCTURE

[75] Inventor: Kiyoshi Koike, Yokohama, Japan

[73] Assignee: Nissan Motor Company, Limited, Kanagawa, Japan

[21] Appl. No.: 340,019

[22] Filed: Jan. 18, 1982

[30] Foreign Application Priority Data

Jan. 21, 1981 [JP] Japan .................... 56-6838[U]

[51] Int. Cl.³ .............................................. B62D 21/00
[52] U.S. Cl. .................................. 280/784; 293/120; 293/132
[58] Field of Search ............... 280/784; 293/132, 133, 293/120

[56] References Cited

U.S. PATENT DOCUMENTS 3,056,462 10/1962 Graham .............................. 293/132
3,171,669 3/1965 Barenyi .............................. 280/784
4,278,282 7/1981 Roubinet et al. .................. 293/132
4,354,700 10/1982 Goupy et al. ...................... 293/132

Primary Examiner—Joseph F. Peters, Jr.
Assistant Examiner—Ross Weaver

[57] ABSTRACT

Herein disclosed is an automotive vehicle structure having a fore-and-aft direction and provided with at least one bumper assembly extending laterally of the automotive vehicle body structure. The vehicle body structure comprises a side member horizontally extending in a fore-and-aft direction and having a vertically intermediate horizontal plane, the bumper assembly being disposed above the horizontal plane, a rigid connecting member structurally intervening between and interconnecting the bumper assembly and the side member, and a rigid projection member projecting from the connecting member in a fore-and-aft direction and located below the horizontal plane.

2 Claims, 3 Drawing Figures

AUTOMOTIVE VEHICLE BODY STRUCTURE

FIELD OF THE INVENTION

The present invention relates to an automotive vehicle body structure having front and rear bumper assemblies.

BACKGROUND OF THE INVENTION

A known automotive vehicle body structure is equipped with front and rear bumper assemblies for absorbing the impact energy caused when the automotive vehicle comes into collision against a certain foreign object. Further, the automotive vehicle body structure has a hook member to which a wire rope may be hooked in the event that the vehicle is required to be towed by another automotive vehicle. Such bumper assemblies and a hook have thus far been arranged without considering deformation or damage to the automotive vehicle upon collision with a foreign object. In the prior-art automotive vehicle, such bumper assemblies are attached to the body structure of the vehicle at a predetermined level prescribed by regulations although the level of a side member forming part of the vehicle body structure can be lowered for the reason of reducing the overall height of the vehicle. If the vehicle comes into frontal or dorsal collision with a certain foreign object, a bending moment is exerted upon a side member to receive an impact load caused by the collision so that the side member is deformed. As a consequence, the side member can not serve as an energy absorbing means for effectively absorbing the impact energy, which makes it impossible to secure the safety of the passengers.

SUMMARY OF THE INVENTION

In accordance with the present invention, there is provided an automotive vehicle structure having a fore-and-aft direction and provided with at least one bumper assembly extending laterally of the automotive vehicle body structure, comprising: a side member horizontally extending in a fore-and-aft direction and having a vertically intermediate horizontal plane, the bumper assembly being disposed above the horizontal plane, a rigid connecting member structurally intervening between and interconnecting the bumper assembly and the side member, and a rigid projection member projecting from the connecting member in a fore-and-aft direction and located below the horizontal plane. The bumper assembly and the rigid projection member may preferably respectively have vertically intermediate horizontal planes, and the distance between the intermediate horizontal planes of the bumper assembly and the side member may be substantially equal to the distance between the intermediate horizontal planes of the side member and the rigid projection member. The rigid projection member may be constituted by a hook member.

BRIEF DESCRIPTION OF THE DRAWINGS

The features and advantages of an automotive vehicle body structure according to the present invention will be more clearly appreciated from the following description taken in conjunction with the accompanying drawings in which.

DESCRIPTION OF THE PREFERRED EMBODIMENTS

Description will be hereinafter made in regard to the embodiment of an automotive vehicle structure according to the present invention.

Figure 1:
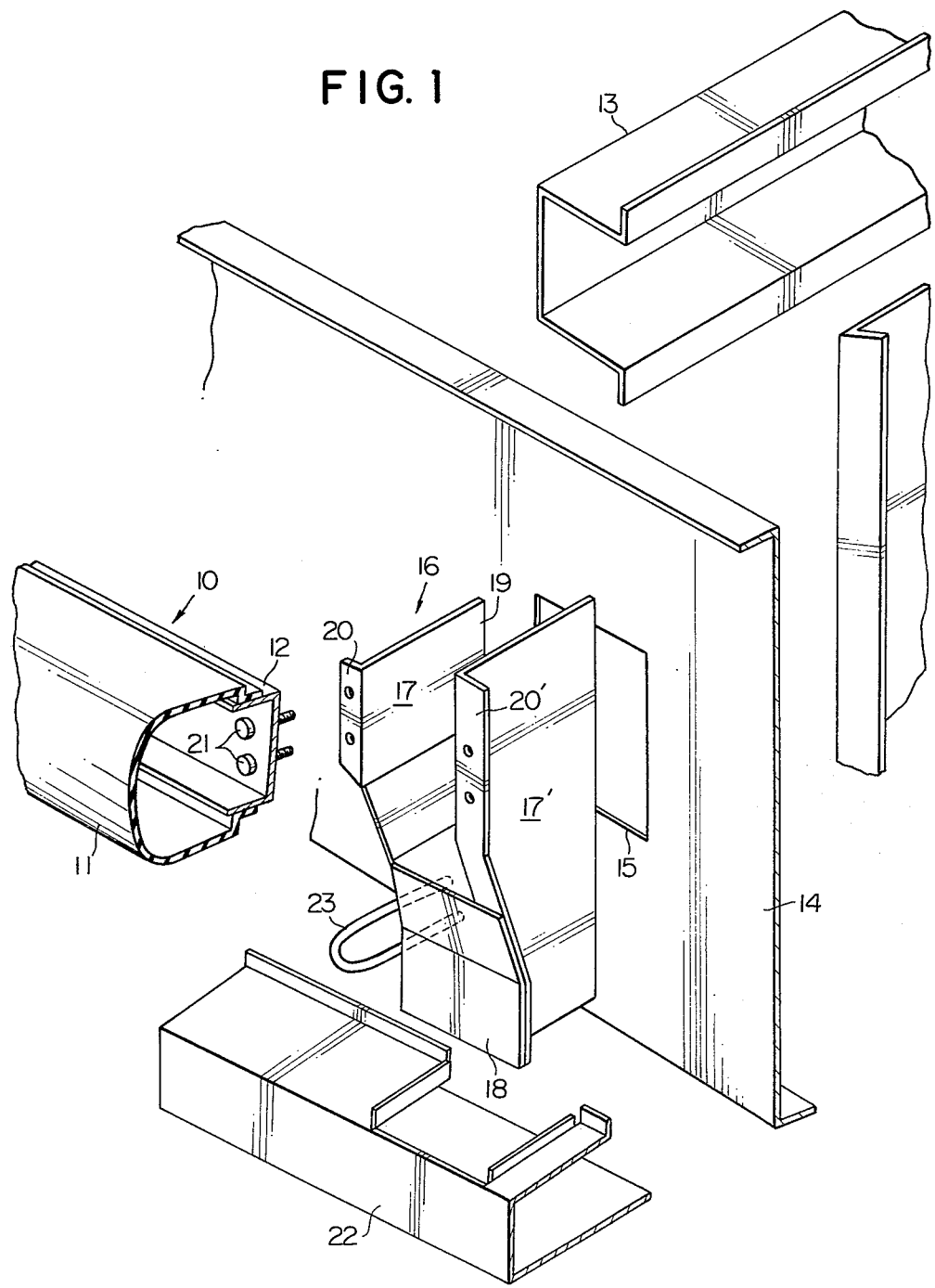
FIG. 1 is a fragmentary exploded perspective view, partly in cross section, of an automotive vehicle body structure according to the present invention.
Figure 2:
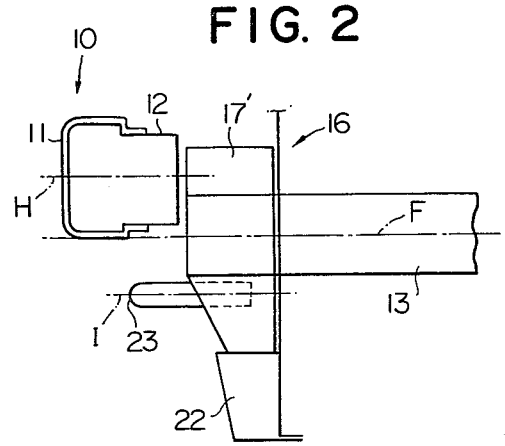
FIG. 2 is a schematic side view of the automotive vehicle body structure according to the present invention and showing the arrangement of a bumper assembly and a hook member forming part of the automotive vehicle body structure according to the present invention, only the bumper assembly being cross sectioned.
Figure 3:
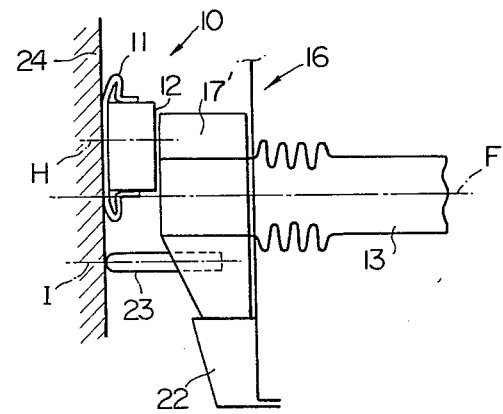
FIG. 3 is a view similar to FIG. 2 but showing the condition under which the bumper assembly and the hook member come into collision with a certain obstacle and absorbs impact energy caused thereby.

Referring now to the drawings and in particular to FIGS. 1 and 2, the automotive vehicle structure embodying the present invention is shown as being provided with a front bumper assembly 10 extending laterally of the automotive vehicle structure and has a fore-and-aft direction. The front bumper assembly 10 includes a resilient member 11 made of rubber and a base member 12 bonded to the resilient member 11 as in the prior-art. The automotive vehicle structure according to the present invention further comprises a side member 13 horizontally extending in a fore-and-aft direction and having a vertically intermediate horizontal plane F above which the front bumper assembly 10 is disposed. A radiator core support panel 14 is formed with an opening 15 through which the front end portion of the side member 13 extends. The automotive vehicle structure according to the present invention further comprises a rigid connecting member 16 which comprises a pair of side panel portions 17 and 17' spaced apart in parallel from each other and securely connected at their inner end to the front surface of the radiator core support panel 14, a front panel portion 18 extending between and integral with the front lower portions of the side panel portions 17 and 17' for forming an opening 19 at the front upper portion of the side panel portions 17 and 17', and a pair of bent portions 20 and 20' laterally bent and extending outwardly from the front ends of the side panel portions 17 and 17'. The front end portion of the side member 13 extends through the opening 15 of the radiator core support panel 14 and the opening 19 of the rigid connecting member 16 and is disposed between the side panel portions 17 and 17' and welded or otherwise securely connected to the side panel portions 17 and 17' of the rigid connecting member 16 and the base member 12 is in turn fixedly attached to the bent portions 20 and 20' of the rigid connecting member 16 by means of bolts 21. The rigid connecting member 16 thus structurally intervenes between and interconnecting the bumper assembly 10 and the side member 13. A cross member 22 has a longitudinally intermediate portion secured to the lower portion of the connecting member 16. A hook member 23 is located below the horizontal plane F of the side member 13 and welded or otherwise securely connected to the side panel portion 17 of the rigid connecting member 16 so as to project from the rigid connecting member 16 in a fore-and-aft direction to the extent that the base member 12 and the hook member 23 are concurrently brought into collision with a certain foreign object 24 after the resilient member 11 is deformed as will been seen in FIG. 3 in the event that the resilient member 11 can not absorb the impact energy caused by the collision between the automotive vehicle and the foreign object 24. The bumper assembly 10 and the hook member 23 respectively have vertical intermediate horizontal planes H and I which are equally spaced apart inwardly from the respective upper and lower surfaces thereof. The distance between the intermediate horizontal planes F and H of the bumper assembly 10 and the side member 13 is substantially equal to the distance between the intermediate horizontal planes F and I of the side member 13 and the hook member 23.

As has been described in the above, it will be appreciated that the impact energy caused between the automotive vehicle and the front bumper assembly 10 can be completely absorbed by deformation of the resilient member 11 when the automotive vehicle comes into light collision with the foreign object 24 upon cruising at a relatively low speed. At this time, the hook member 23 is not brought into collision with the foreign object 24. When, on the other hand, the automotive vehicle is violently collided with the foreign object 24 during cruising at a relatively high speed, the front bumper assembly 10 and the hook member 23 are concurrently collided with the foreign object 24 and thus can simultaneously absorb the impact energy caused thereby after the resilient member 11 is deformed. The impact load is equally distributed on and absorbed by the base member 12 of the front bumper assembly 10 and the hook member 23. This results in the fact that the bending moment is not exerted on the side member 13 which is by no means bendingly deformed but compressivly deformed. As a consequence, the impact load can be acted on the side member 13 in the fore-and-aft direction thereof and can effectively be absorbed by the compressive deformation of the side member 13.

While it has been described in the foregoing description that the rigid hook member 23 may be replaced by a rigid box-shaped member according to the present invention. The rigid box-shaped member is required to project from the connecting member 16 in a fore-and-aft direction and to be located below the horizontal plane F of the side member 13. Further, such a rigid projection member may be provided on the vehicle body structure in combination with a rear bumper assembly which is of substantially the same construction as that of the front bumper assembly 10.

As will be seen from the previously mentioned description, the rigid projection member and the bumper assembly cooperatively impart a compressive deformation to the side member and can equally absorb the impact energy. As a result, the automotive vehicle body structure can effectively absorb the impact energy and can secure the safety of the passengers.

What is claimed is:

1. An automotive vehicle body structure having a fore-and-aft direction and provided with at least one bumper assembly extending laterally of the automotive vehicle body structure, comprising:
    a side member horizontally extending in said fore-and-aft direction and having a vertically intermediate horizontal plane, said bumper assembly being disposed above the horizontal plane,
    a rigid vertically disposed connecting member structurally intervening between and interconnecting said bumper assembly and said side member, and
    a hook member connected directly to and projecting from said connecting member in said fore-and-aft direction and located below said horizontal plane, the hook member terminating in a position located inwardly of a front end of said bumper assembly.

2. An automotive vehicle body structure as set forth in claim 1, in which said bumper assembly and said projection member respectively have vertically intermediate horizontal planes, and in which the distance between the intermediate horizontal planes of said bumper assembly and said side member is substantially equal to the distance between the intermediate horizontal planes of said side member and said projection member.

* * * * *